United States Patent [19]

Janson

[11] 4,377,093
[45] Mar. 22, 1983

[54] SHIFT MECHANISM FOR A FIVE SPEED TRANSAXLE TRANSMISSION

[75] Inventor: David A. Janson, Plymouth, Mich.

[73] Assignee: Ford Motor Company, Dearborn, Mich.

[21] Appl. No.: 126,930

[22] Filed: Mar. 3, 1980

[51] Int. Cl.$^3$ .......................... G05G 5/10; F16H 3/38
[52] U.S. Cl. .................................. 74/477; 74/473 R; 74/359; 74/339
[58] Field of Search ............... 74/473 R, 477, 359, 74/335, 339

[56] References Cited

U.S. PATENT DOCUMENTS

| | | | |
|---|---|---|---|
| 3,264,893 | 8/1966 | Stott et al. | 74/477 |
| 3,264,894 | 8/1966 | Popovich et al. | 74/477 |
| 3,554,047 | 1/1971 | Stott | 74/477 |
| 3,929,029 | 12/1975 | Kelbel | 74/473 R |
| 3,939,724 | 2/1976 | Takahashi et al. | 74/477 X |
| 3,962,930 | 6/1976 | Frazee | 74/473 R |
| 4,000,662 | 1/1977 | Wolfe | 74/359 X |
| 4,094,206 | 6/1978 | Sogo et al. | 74/335 X |
| 4,174,644 | 11/1979 | Nagy et al. | 74/476 X |
| 4,193,316 | 3/1980 | Kelbel | 74/477 |
| 4,222,281 | 9/1980 | Mylenek | 74/477 X |
| 4,228,693 | 10/1980 | Kelbel | 74/473 R X |

Primary Examiner—Leslie A. Braun
Assistant Examiner—Lawrence J. Gotts
Attorney, Agent, or Firm—Frank G. McKenzie; Donald J. Harrington

[57] ABSTRACT

A multiple speed ratio power transmission mechanism for an automotive vehicle adapted to be mounted in a transverse position with respect to the fore-and-aft centerline of the vehicle includes a torque input shaft having input gearing fixed thereto. A first countershaft has gearing journalled thereon meshing with the torque input gearing, and synchronizer clutches adapted to be moved selectively to produce a driving connection between the input shaft and the countershaft. A second countershaft has a fifth forward speed gear in meshing engagement with a gear on the input shaft and a synchronizer clutch that can be moved to produce a driving connection between the input shaft and the second countershaft. A differential gear establishes a driving connection between both countershafts and each of two drive wheel axle shafts. First and second shift fork rails are adapted for axial and rotary movement to produce engagement and release of the synchronizer clutches. A shift selector controls the shift shaft and has a relay lever for transferring the motion of the selector shaft directly to the first shift rail, indirectly to the second shift rail through a first bellcrank, and indirectly to a reverse idler through a second bellcrank. An interlock sleeve is mounted on the first shift rail and provides a selector pin for selective engagement directly and indirectly with each of the three shifting forks. A blocking sleeve surrounds the interlock sleeves and prevents engagement of the first shift rail with the unselected shift forks.

3 Claims, 11 Drawing Figures

SHIFT MECHANISM FOR A FIVE SPEED TRANSAXLE TRANSMISSION

BACKGROUND OF THE INVENTION

1. Field of the Invention

My invention relates generally to the shift mechanism for an automotive vehicle transmission, and especially to a transaxle transmission mechanism wherein a common axis of the engine and transmission is transversely disposed with respect to the fore-and-aft axis of the vehicle.

2. Description of the Prior Art

The shift mechanism according to my invention operates to provide the shifting motion in a transaxle transmission having, in addition to the conventional forward speed ratios and a reverse speed ratio, a fifth or overdrive speed ratio. A gearshift mechanism for such a transmission must allow the conventional gearshift pattern for the lowest four forward speed ratios and the reverse gear ratio that has received general acceptance within the automotive industry. In addition, a fifth forward speed plane must be added to the conventional shift pattern adjacent the three-four shift plane and remote from the reverse shift plane. The transmission with which such a shift mechanism is designed to work includes a first shift rail on which two shift forks and a reverse pinion shift collar are mounted and a second shift rail on which a third shift fork is mounted for controlling the engagement of the fifth speed gears. Present-day transmissions are required to provide a positive interlock system, which assures that the shift cane controlled by the vehicle operator will engage the speed ratio selected by the operator. The interlock must positively prevent all other speed ratios from becoming accidentally engaged. Furthermore, the shift mechanism must provide means to prevent accidental disengagement of the selected gears from the driving connection.

Shifting mechanisms for controlling a four forward speed ratio transmission providing the interlocking capability are well known. U.S. Pat. Nos. 3,264,893; 3,962,930 and 4,174,644 describe shift mechanisms of this type. However, shifting mechanisms adapted to control a four speed transmission are not suitable for controlling the shifting motion required in a five speed transmission.

The movement of the shift selector shaft in a transaxle transmission can be transferred to a first shift rail so that the shift forks mounted on the rail are moved in response to the control motion applied to the shift selector shaft by the vehicle operator. Furthermore, it is known in the art that the first shift rail can be adapted to cause a reverse idler to engage selectively the reverse drive gears of the transmission in response to motion of the shift selector shaft. A shift interlock system can be readily adapted to block engagement of unselected speed ratios and to allow driving engagement only of the selected speed ratio by mounting an interlock collar and selector pin on this first shift rail.

However, when a second shift rail is required in a five speed transaxle transmission, the shifting movement of the shift selector shaft must be coordinated between two shift rails and the interlock system must be effective in blocking the motion of the unselected shift rail and of the unselected shift forks mounted on the selected shift rail.

SUMMARY OF THE INVENTION

Motion from a shift selector shaft is transmitted by a relay lever directly to a first shift rail and indirectly to a second shift rail by way of a first bellcrank and indirectly to a reverse idler pinion by way of a second bellcrank. The first shift rail has two selector forks adapted to move each of two synchronizer clutch sleeves to produce a driving engagement between the input shaft and each of four low speed ratio driving gears that are mounted on a first countershaft. A second countershaft has a fifth speed ratio gear journalled thereon and a synchronizer clutch sleeve adapted to engage the gear and to produce a driving connection between the input shaft and the fifth speed ratio output gear. A second shift rail has a third shifting fork mounted thereon to move the clutch sleeve of the second countershaft.

The first and second shift forks have arms providing notches arranged around the circumference of the first shift rail. A fifth speed ratio bellcrank engages the third shift fork at one end and furnishes a second end adjacent the notches of the first and second shift forks in circumferential disposition with respect to the first shift rail. A selector pin mounted on the first shift rail selectively engages the fifth speed ratio bellcrank or the first or the second shift fork. An interlock sleeve is moved into registry with the two unselected shift forks. The fifth speed ratio bellcrank, therefore, transfers the movement of the first shift rail to the second shift rail, thereby controlling the motion of the third synchronizer of the clutch sleeve.

The first shift rail has an arm that engages a first end of a reverse idler bellcrank and transfers shifting motion of the shift selector shaft in the reverse plane into an axial shifting movement of the reverse idler pinion. The pinion, when displaced from its neutral position, is caused to engage and to produce a driving connection between the reverse gears on the input shaft and the first countershaft.

The shifting mechanism is arranged to coordinate the shifting movement of the first shift rail with the reverse idler bellcrank, the fifth forward speed bellcrank and the first and second shift forks. The interlock controls motion of the selector shaft to produce the requisite engagement of the selected gear but no other gears of the transmission.

DESCRIPTION OF THE PREFERRED EMBODIMENT

Figure 1:
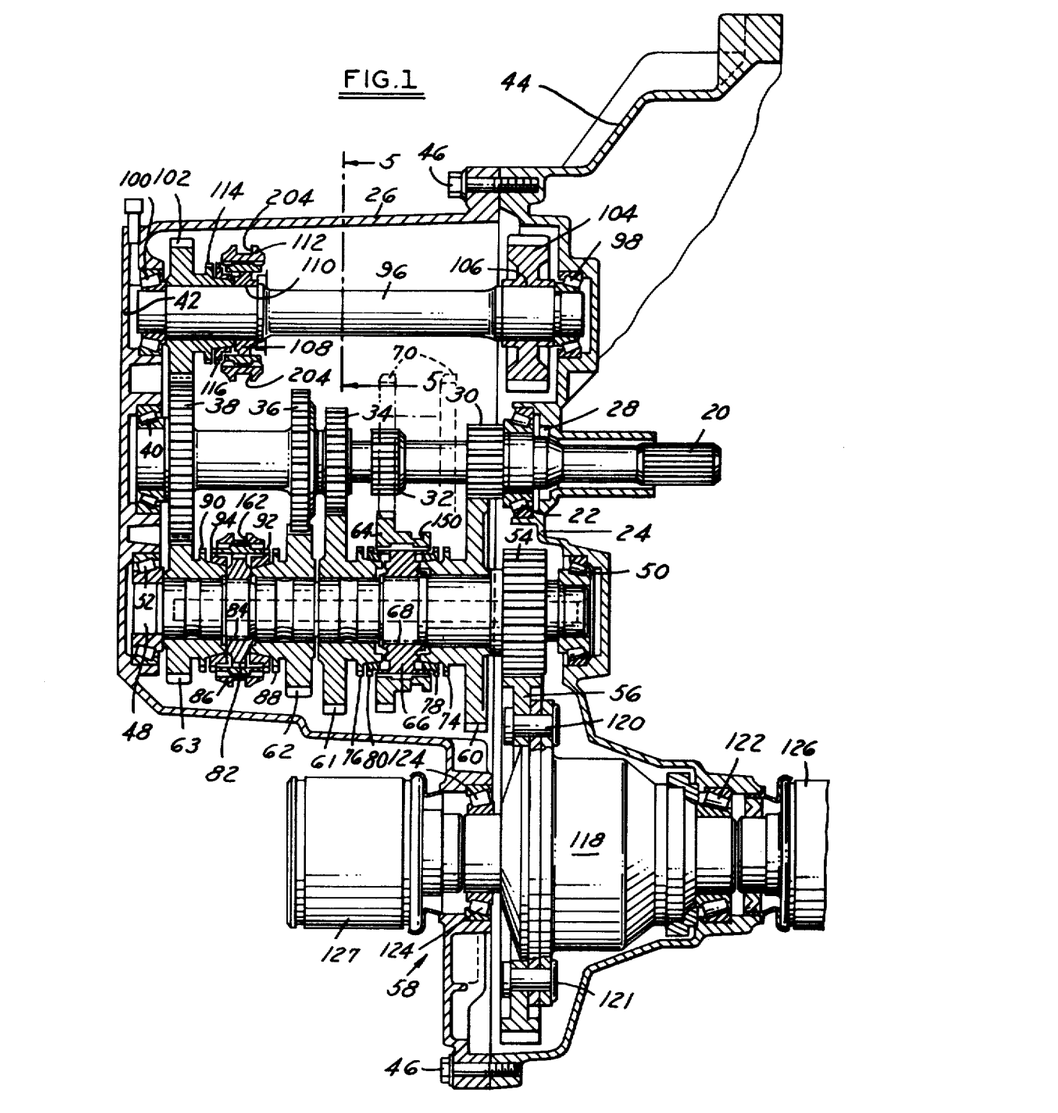
FIG. 1 is a cross-sectional view of the transmission gearing arrangement for my invention taken at the plane 1—1 of FIG. 2.
Figure 2:
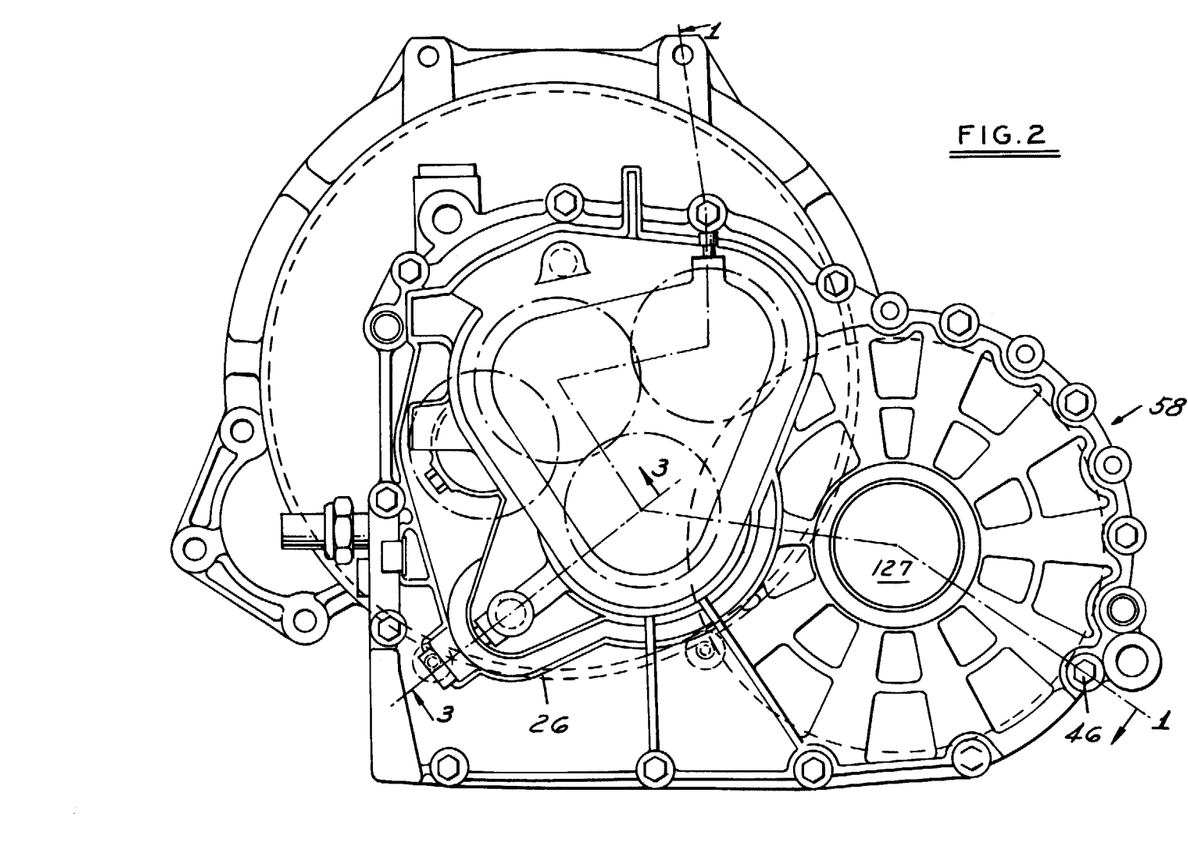
FIG. 2 is an end view of the transmission assembly shown in FIG. 1.

Referring first to FIG. 1, an input shaft 20 is journalled in a bearing 22 mounted in the support wall 24 of the transmission housing 26. A shaft seal 28 located in an annular recess formed in the support wall 24 seals the outer periphery of the shaft 20.

Formed on or carried by the shaft 20 are five torque input gears shown respectively at 30, 32, 34, 36, 38. These gears form a delivery path during operation in low speed ratio, reverse, second speed ratio, third speed ratio and fourth speed ratio, respectively. The drive gear 38 further operates to provide a portion of the torque delivery path for fifth speed ratio. The left end of the input shaft is journalled by bearing 40 in a bearing opening formed in the end wall 42 of the housing 26. The right-hand end of the housing 26 is bolted to the left-hand end of the clutch housing 44 as indicated by the attachment bolt 46.

A countershaft 48 is journalled at one axial end in the bearing 50, which is received in the recess formed in right-hand wall 24 and at the opposite end in the bearing 52, which is received in a recess formed in the end wall 42. The torque output gear 54 is fixed to or integrally formed with the countershaft 48 and meshes with the output gear 56, which drives a differential gear assembly designated generally by the reference character 58. The countershaft 48 supports output gears 60–63 each of which forms a part of the torque delivery paths for low speed ratio drive, second speed ratio drive, third speed ratio drive and, fourth speed ratio drive. The output gears 60–63 are journalled on the outer surface of the countershaft 48.

A reverse gear 64 is carried by the synchronizer hub 66, which is splined at 68 to the countershaft 48. The reverse gear 64 is splined to the outer periphery of the synchronizer hub 66 and is adapted for axial sliding movement on the hub. A reverse drive pinion 70, is moved between the axial extremities shown in FIG. 1 and is adapted to engage the gear 64. The reverse pinion 70 can be moved axially on a reverse pinion support shaft 76 (FIG. 8) on which it is journalled. The reverse gear 64, which forms a part of the reverse torque delivery path, has internal clutch teeth that are adapted to engage external clutch teeth 74, 76 formed respectively on the hubs of output gears 60 and 61 between the synchronizer hub 66 and the gear 61, 62. The synchronizer rings 78, 80 act in a known fashion to synchronize the rotary motion of the clutch teeth on the reverse gear 64 with the external clutch teeth 74, 76 on gears 60, 61, depending on which direction the reverse gear 64 is shifted axially.

Figures 8, 11:
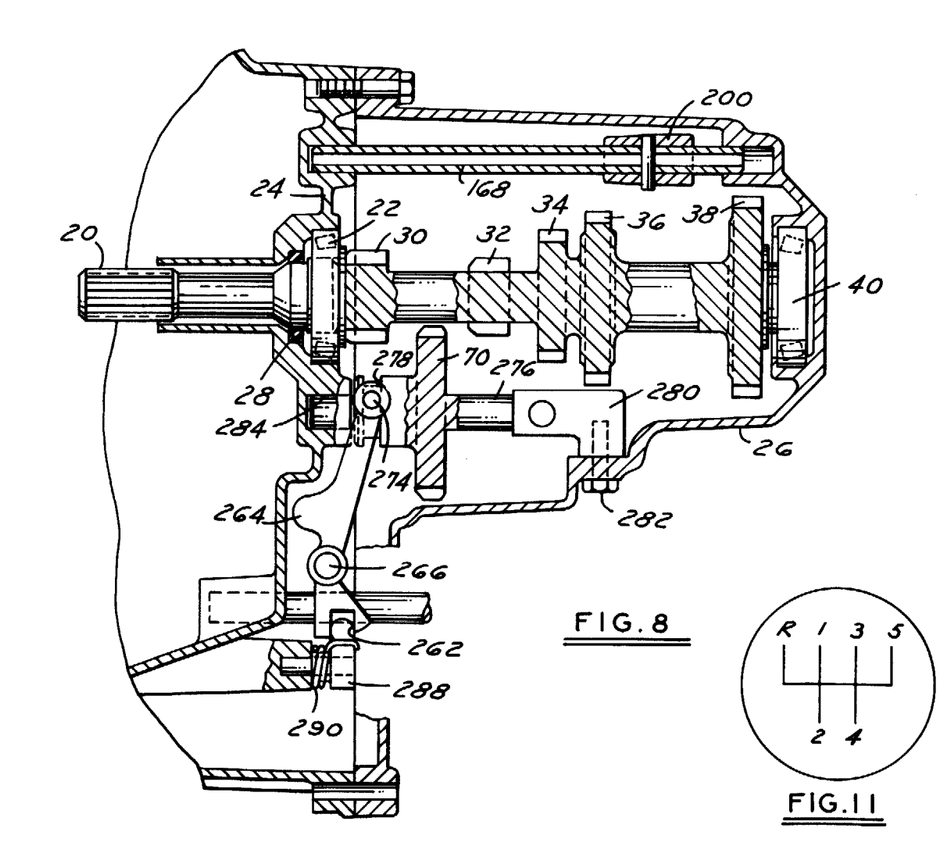
FIG. 8 is a cross-sectional view taken at the discontinuous plane marked 8—8 of FIG. 7.
FIG. 11 is a diagram showing the motion pattern of a manually controlled shift cane operated by the vehicle operator to select the various driving ratios of the transmission.

When the reverse gear is in the central position indicated in FIG. 1 and when the reverse pinion 70 is shifted in the left-hand direction as seen in that figure, the reverse pinion 70 is brought into engagement with the reverse input gear 32 and with reverse gear 64 thereby completing a reverse torque delivery path between the input shaft 20 and the output gear 54. When operating the transmission in any ratio except reverse ratio, the reverse pinion 70 assumes the position at the left-hand end of its support shaft 276 as seen in FIG. 8. When reverse gear 64 is shifted in a left-hand direction, the clutch teeth 76 on the output gear 61 engage with the internal clutch teeth of the reverse gear 64, thereby establishing a driving connection between the countershaft 48 and the output gear 61. The synchronizer clutch ring 80 establishes synchronism before the clutching engagement.

A second or 3-4 synchronizer clutch hub 82 is splined at 84 to countershaft 48 and has external splines on which the internally splined synchronizer clutch sleeve 86 is slideably mounted. The sleeve 86 has internal clutch teeth that are adapted to engage external clutch teeth 88, 90 formed respectively on the hubs of the output gears 62 and 63. In the conventional way, the synchronizer clutch rings 92, 94 are positioned between the synchronizer clutch hub 82 and the output gears 62 and 63 to establish rotational synchronism between the countershaft 48 and either output gear 62 or 63, depending upon the direction in which the synchronizer clutch sleeve 86 is moved.

An auxiliary countershaft 96 is supported at one axial end by the bearing 98, which is received in a recess formed in the end wall 24, and at the opposite axial end by the bearing 100, which is carried by a recess in the end wall 42. A fifth speed ratio input gear 102 is journalled on the outer surface of the auxiliary countershaft 96 and is in meshing engagement with the input gear 38 and the output gear 63. At the opposite axial end of the auxiliary crankshaft, a fifth speed ratio drive pinion 104 is joined to the auxiliary countershaft 96 by the splines 106 and is in meshing engagement with the output gear 56 of the differential assembly as is pinion 54. Intermediate the fifth speed ratio gear 102 and the fifth speed ratio pinion 104, a third synchronizer clutch hub 108 is splined at 110 to the countershaft 96. Hub 108 has external splines on which an internally splined synchronizer clutch sleeve 112 is mounted. The sleeve 112 is formed with internal clutch teeth that are adapted to engage external clutch teeth 114 formed on the hub of the fifth speed input gear 102. A synchronizer clutch ring 116 is positioned between the external clutch teeth 114 and the synchronizer clutch 108 to establish rotational synchronism between the auxiliary countershaft 96 and the gear 102.

The differential gear assembly 58 includes the output gear 56 which is riveted to a flange formed on the differential assembly 58 at 120, 121. The differential assembly 58 is journalled at one end by the bearing 122 which is received in an annular recess formed on the end wall 24, and at the opposite axial end by the bearing 124, which is received in an annular recessed formed in the transmission housing 26. Bevel gears (not shown) mounted on driveshafts transmit engine torque to each of two universal joints 126, 127 through which drive is transmitted to each of the forward wheels of the vehicle.

The transmission is conditioned for first speed ratio operation by positioning the reverse pinion 70 in the neutral position shown in FIG. 1 at the right-hand extremity of its travel and synchronizer sleeves 86, 112 in their neutral positions. The reverse output gear 64 is moved to the right to establish clutching engagement between the countershaft 48 and the gear 60. In this case the delivery path includes the input shaft 20, the first speed ratio input gear 30, the output gear 60, pinion 54 and the output gear 56.

The second speed ratio operation is produced when the reverse idler 70 is placed in the neutral position out of engagement with the reverse gear 32 and synchronizer sleeves 86, 112 in their neutral position. Then 1-2 synchronizer sleeve 64 is shifted to the left and into engagement with the external clutch teeth 76 on the gear 61. The torque delivery path in this case includes the input shaft 20, input gear 34, output gear 61, the countershaft 48, output pinion 54 and the output gear 56.

For a third speed ratio operation, the reverse gear 70 is again positioned in the neutral position out of engagement with the reverse input gear 32 and synchronizer sleeves 64, 112 in their neutral positions. The second or 3-4 synchronizer clutch sleeve 86 is shifted to the right into driving engagement with the external clutch teeth 88 formed on the gear 62. In this way, the gear 62 is fixed to the countershaft 48 through the spline 84 formed on the inside diameter of the second synchronizer clutch hub 82. The torque delivery path for third speed ratio operation includes the input shaft 20, the input gear 36, the third speed ratio output gear 62, the countershaft 48, the output pinion 54 and the output gear 56.

The fourth speed ratio occurs when the reverse pinion 70 is in its neutral position, disengaged from the reverse gear 32, and the 1-2 clutch sleeve 64 is disengaged from either drive gears 60, 61 and sleeve 112 is in its neutral position. The second synchronizer clutch sleeve 86 is shifted to the left into engagement with the external clutch teeth 90 formed on the hub of the fourth speed ratio output gear 63. The torque delivery path for fourth speed ratio includes the input shaft 20, the input gear 38, the output gear 63, the countershaft 48, the output pinion 54 and the output gear 56.

The third synchronizer clutch sleeve 112 is disengaged from gear 102 for first, second, third and fourth speed ratio operation as well as for reverse operation. Shifting the 1-2 synchronizer sleeve 64 fore and aft produces a driving connection between the gears 60 and 61 and the countershaft 48 by way of the spline 68. The second synchronizer clutch sleeve 86, when shifted into engagement with the clutch teeth of gears 62, 63, causes a driving connection to be created between those gears and the countershaft 48.

Fifth forward speed ratio operation, which is an overdrive condition, is produced when the reverse idler 70, the 1-2 synchronizer sleeve 64 and the second synchronizer clutch sleeve 86 are neutrally positioned. In this case, the third synchronizer clutch sleeve 112 is shifted to the left into engagement with the external clutch teeth 114 formed on the hub of the fifth speed output gear 102 on the auxiliary countershaft 96. This action secures the gear 102 in driving relation on the auxiliary shaft 96 by way of the splines 110 formed on the inside of the diameter of the third synchronizer clutch hub 108. The torque delivery path for the fifth speed ratio operation includes the input shaft 20, the input gear 38, the fifth speed output gear 102, the auxiliary countershaft 96, the fifth speed pinion 104 and the output gear 56.

The first shaft rail 140 (FIG. 3) is supported at each axial end in the cylindrical bore surfaces 142, 143, formed in the transmission housings 26 and 44. One end of the shift rail 140 has three circumferential grooves 144, which are engaged selectively by a detent pin 146 that is spring loaded and engages with any of the recesses depending upon the axial position of the shift rail 140. The first shift fork 148 is slidably supported on the shift rail. The shift fork 148 includes selector fingers 152 which extend radially outward from the shift rail 140 and are received in the annular groove 150 formed in the hub of the reverse gear 64. The shift fork 148 has an axially extending arm portion 154 that extends toward shift interlock mechanism generally indicated by the reference number 156.

Figure 3:
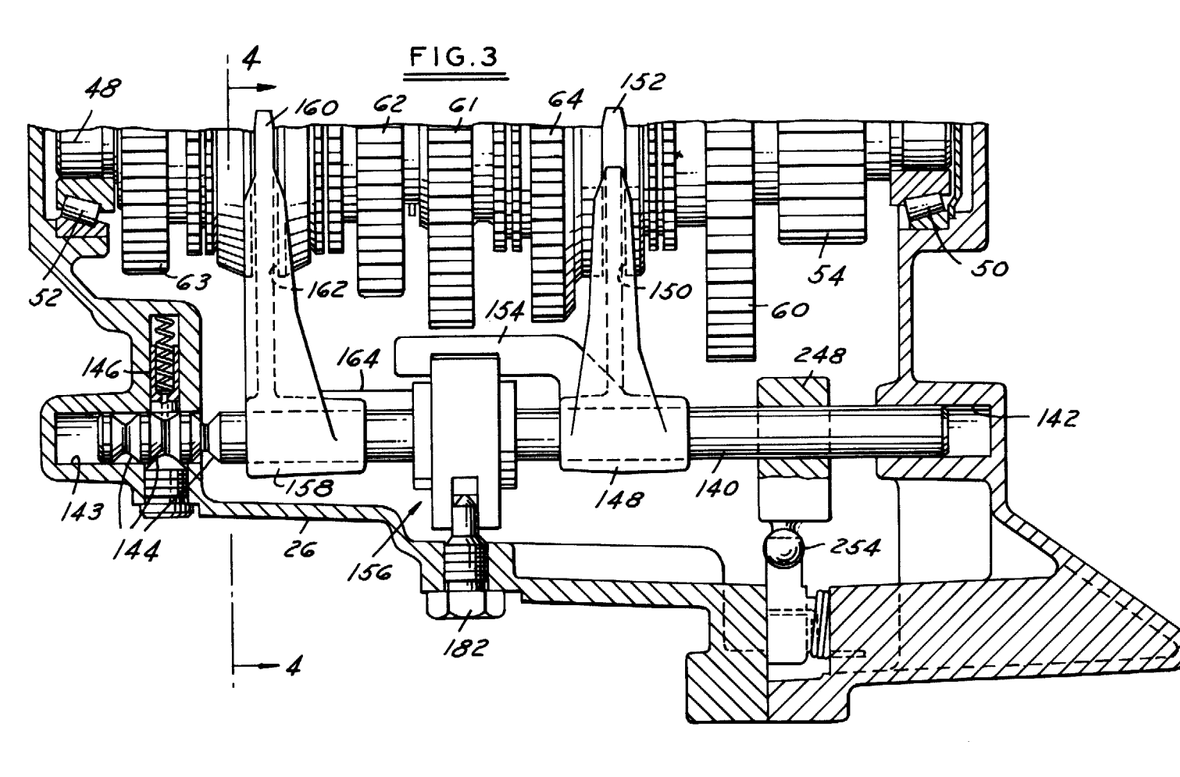
FIG. 3 is a cross-sectional view taken at the plane 3—3 of FIG. 1 showing a first shift rail with the first and second shift forks mounted thereon.

A second shift fork 158 is slidably received over the shift rail 140 and includes selector fingers 160 that extend radially outwardly from the shift rail and which are received in the annular groove 162 formed on the outer surface of the second synchronizer clutch sleeve 86. The shift fork 158 includes an axially extending arm 164 that is directed toward the shift interlock selector mechanism 156 and has a transverse notch to receive a selector pin that is a part of the interlock mechanism.

Figure 4:
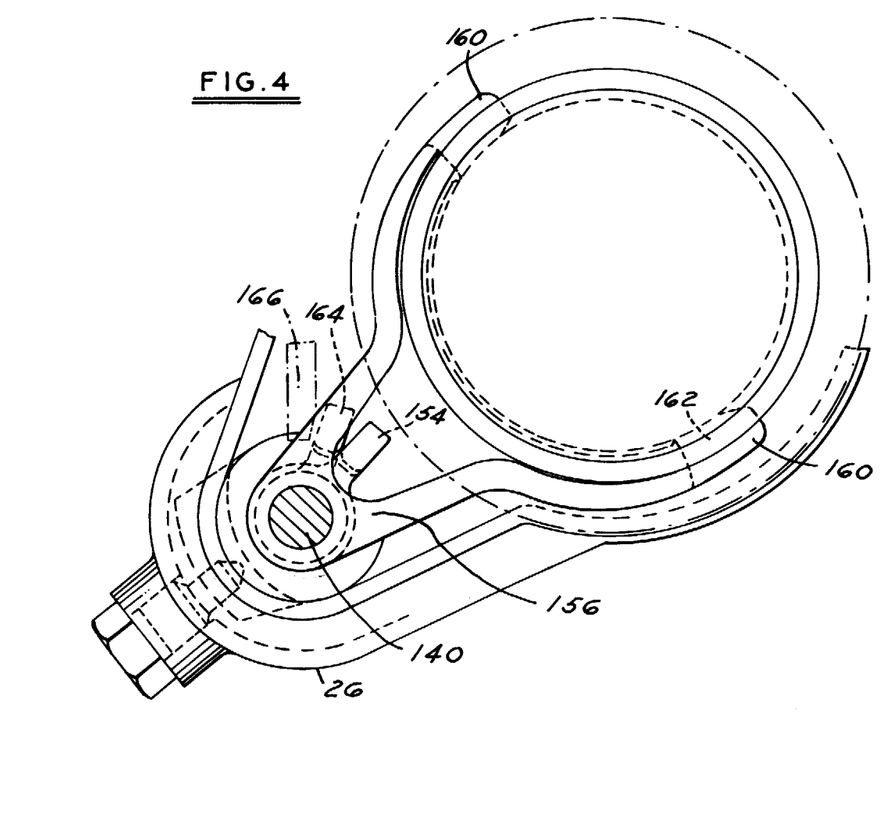
FIG. 4 is a cross-sectional view taken at the plane 4—4 of FIG. 3.
Figure 5:
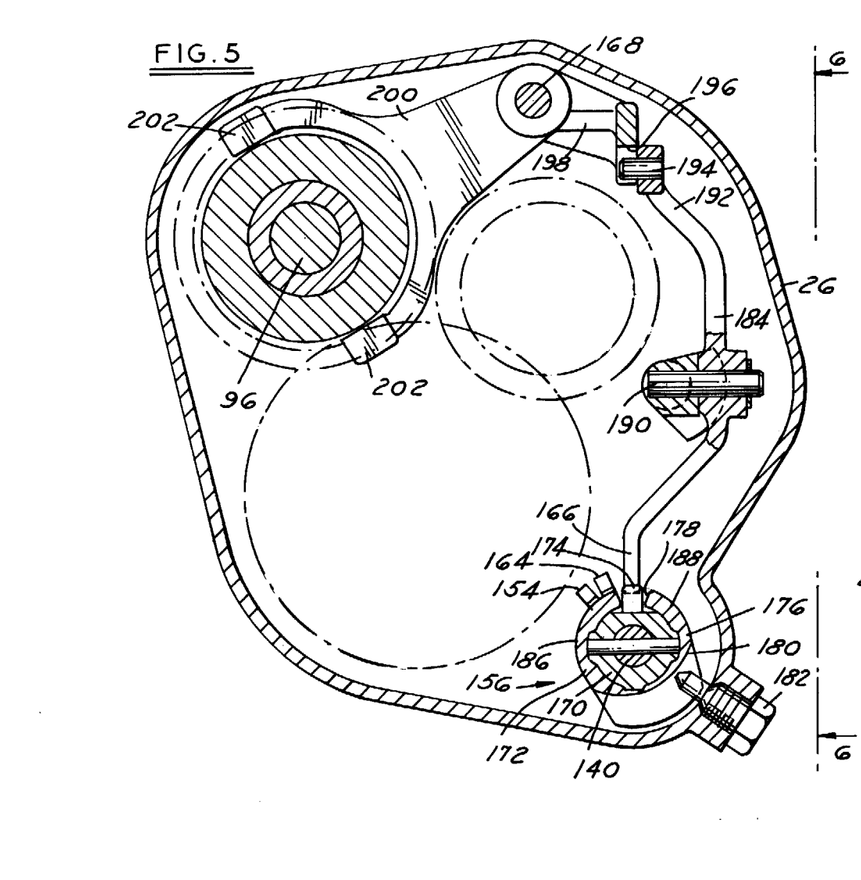
FIG. 5 is a cross-sectional view taken at the plane 5—5 of FIG. 1 showing a second shift rail with a third shift fork mounted thereon and adapted to produce fifth speed ratio or overdrive operation.

FIGS. 4 and 5 show the axially extending arms 154, 164 of the shift forks 148, 158, respectively arranged around the circumference of the shift rail 140. A third arm 166, positioned adjacent the fork arm 164, is the end of a bellcrank that operates to shift the third shift fork 200 axially on a second shift rail 168.

FIG. 5 shows the shift interlock selector mechanism 156, the two arms 164, 154, and bellcrank end 166 arranged around the outer periphery of the shift rail 140. The interlock mechanism includes a selector sleeve 170 which is mounted on the outer surface of the shift rail 140 and secured to it by the mounting pin 172. The selector sleeve 170 includes a selector pin 174 that extends radially outward from the axis of the shift rail 140 to selectively engage the arms 154, 164 or 166 depending upon the angular position of the shift rail 140. An interlock sleeve 176 is loosely fitted over the selector sleeve 170 and furnishes a slot 178 that extends parallel to the axis of the shift rail and a second circumferential slot 180. The axial slot 178 allows the selector pin 174 to extend beyond the outer periphery of the interlock sleeve to selectively engage the arms 154, 164, 166. The interlock sleeve is caused to rotate with the shift rail 140 because of the contact of the selector pin 174 in the slot 178 and of the keyway attachment that results from the fit of the outer contour of the selector sleeve 170 within the interlock sleeve. The circumferential slot 180 receives the inner end of a mounting bolt 182 that is threaded into the transmission housing 26 and permits the shift rail and selector finger to rotate from the position shown in FIG. 5. The end of the bolt 182 remains within the slot 180 and axial shifting of the interlock sleeve is thereby prevented.

The interlock sleeve functions to prevent movement of the shift forks 148, 158 and of the bellcrank 184 unless selector pin 174 is aligned with the notches in arms 154, 164 and in bellcrank arm 166. For example, in FIGS. 5 and 6 the selector pin 174 is shown to be engaged with the arm 166 of the bellcrank 184 and a blocking flange 186 of sleeve 172 is seen to engage the arms 154, 164 thereby preventing axial shifting of the first and second shift forks 148, 158. Alternatively, if the shift rail were rotated to align the selector pin 174 with the arm 164, the blocking flange 186 would prevent axial shifting movement of the first shift fork 148 because the blocking flange 186 would still be engaged with the arm 154. In this instance, a second blocking flange 188 will be rotated into engagement with the bellcrank end 166, thereby preventing rotation of the bellcrank 184 about the axis of the stub shaft 190 on which it is journalled. Similarly, when the shift rail 140 is rotated to align the selector pin 174 with the arm 154, the blocking flange 188 will engage both the arm 164 and the bellcrank end 166 thereby preventing axial shifting of the second shift fork 158 and rotation of the bellcrank 184.

Figure 6:
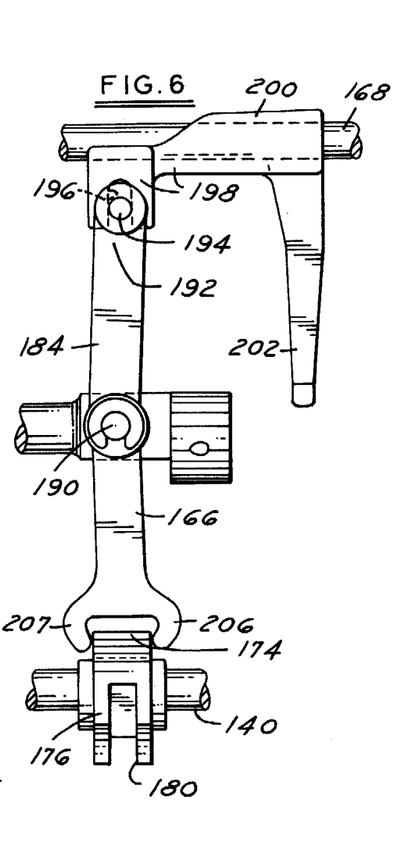
FIG. 6 is a side view of the fifth speed ratio fork shifting bellcrank taken in the direction 6 of FIG. 5.

The bellcrank 184 has an operating end 192 on which is mounted a transversely directed pin 194 for engagement in the open-ended slot 196 formed on an extension 198 of a third shift fork 200. The shift fork 200 is fixed to the second shift rail 168, which is mounted at each axial end on a support surface formed in the transmission housing that allows axial movement of the shift rail 168. The third shift fork 200 includes selector fingers 202 which engage the annular groove 204 formed on the outer surface of the third synchronizer clutch sleeve 112.

When the bellcrank 184 is rotated about the axis of the stub shaft 190 in response to axial movement of the shift rail 140, the third shift fork 200 causes the third synchronizer clutch sleeve 112 to move into engagement with the external clutch teeth 114 of the fifth speed ratio input gear 102. This action causes a driving connection to be produced between the gear 102 and the auxiliary countershaft 196.

The fifth speed ratio shift bellcrank 184 terminates at its actuated end 166 at an opening between two fingers 206, 207, which receive the selector pin 174 in the opening. When the shift rail 140 is rotated into alignment with the end 166 and, then, shifted axially, the selector pin 174 causes the bellcrank 184 to pivot about the stub shaft axis 190. This movement causes the shift fork 200 to move the synchronizer sleeve 112 to produce the driving engagement with the auxiliary countershaft 96. When the shift cane is returned to the neutral position, the shift rail 140 is moved axially. This causes the bellcrank 184 to return to its neutral position and shift fork 200 to disengage the synchronizer sleeve 112 thereby disengaging the driving connecting between the auxiliary countershaft 96 and the fifth speed ratio input gear 102.

A shift lever construction for controlling the motion of the synchronizer clutches is illustrated in FIGS. 7-10. A main shift selector shaft 208 is slidably mounted in openings 210, 211 formed in the transmission housing. The opening 211 is provided with a fluid seal 212 and a protective flexible boot 214 at the end of the shift selector shaft 208. At the opposite end of the shaft 208, a detent pin 216 is biased to engage recesses 218 formed on the shaft. The pin holds the selector shaft in the selected position to prevent its inadvertent axial movement, but allows rotary movement about the central axis of the shaft. A selector block 220 is fixedly secured to the shaft 208 and has a cylindrical socket 222 formed therein which extends in a generally radial direction from the shaft. A guide pin arm 224 integrally formed with the block 220 has a terminal boss 226 that receives a guide pin 228 disposed generally in a radial direction with respect to the axis of the selector shaft 208. The guide pin 228 is received in the slots 230 of the guide plate 231 which is mounted on an interior surface of the transmission housing 26. The guide pin 228 is required to move within the spaces defined by the slots 230 thereby defining the range of motion in which the selector shaft 208 may move. The vehicle operator controls the rotation and axial displacement of the selector shaft 208 by way of the control he exercises over a shift cane positioned generally perpendicular to the axis of the shaft 208 and extending into the passenger compartment of the vehicle. The conventional shift pattern among the various speed ratios of the transmission is presented in FIG. 11. The guide pin 228 and guide plate 231 ultimately determine the possible range of motion of the shift selector shaft 208 regardless of the control exercised by the vehicle operator over the shift cane. This control function is more fully explained in U.S. patent application Ser. No. 76,117, filed Sept. 17, 1979.

Figure 9:
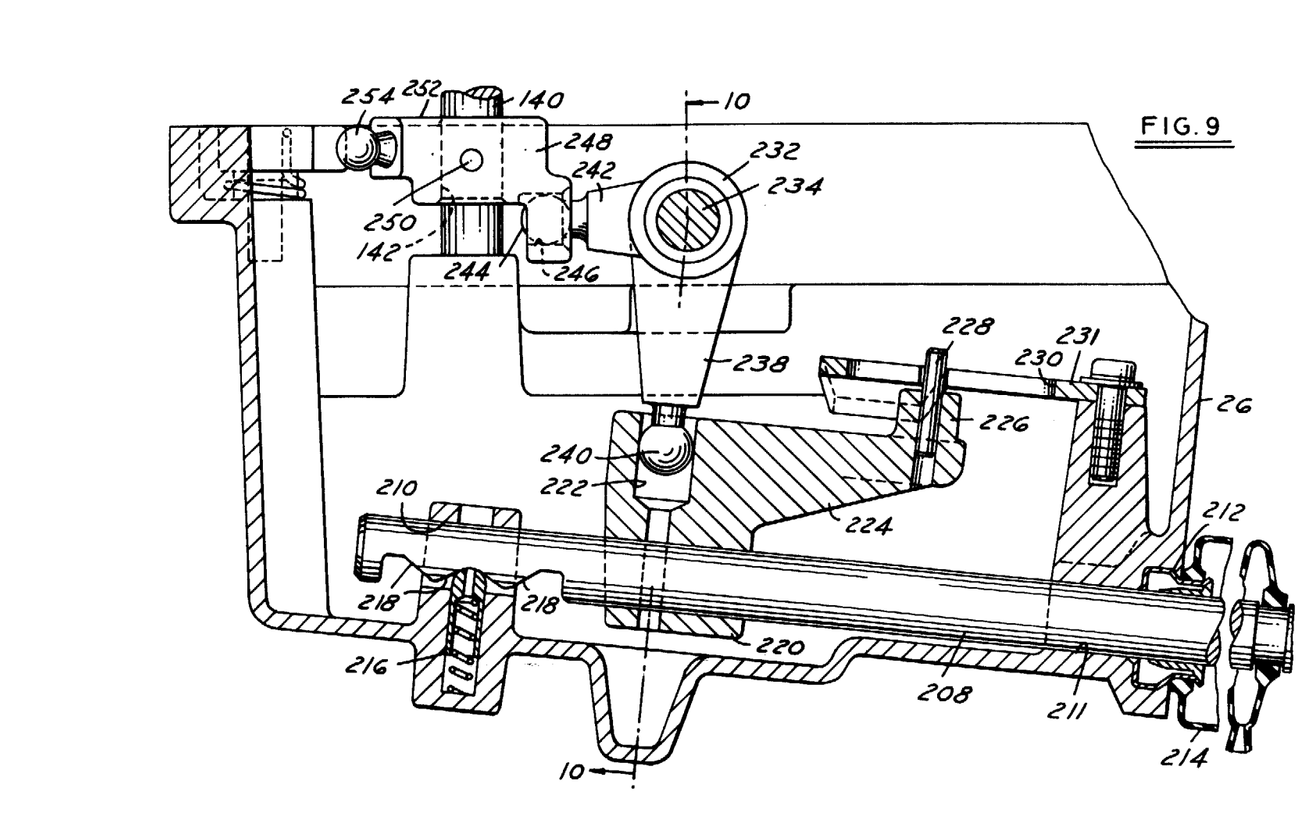
FIG. 9 is a cross-sectional view of the shift selector shaft and shift mechanism from the direction 9 of FIG. 7.
Figure 10:
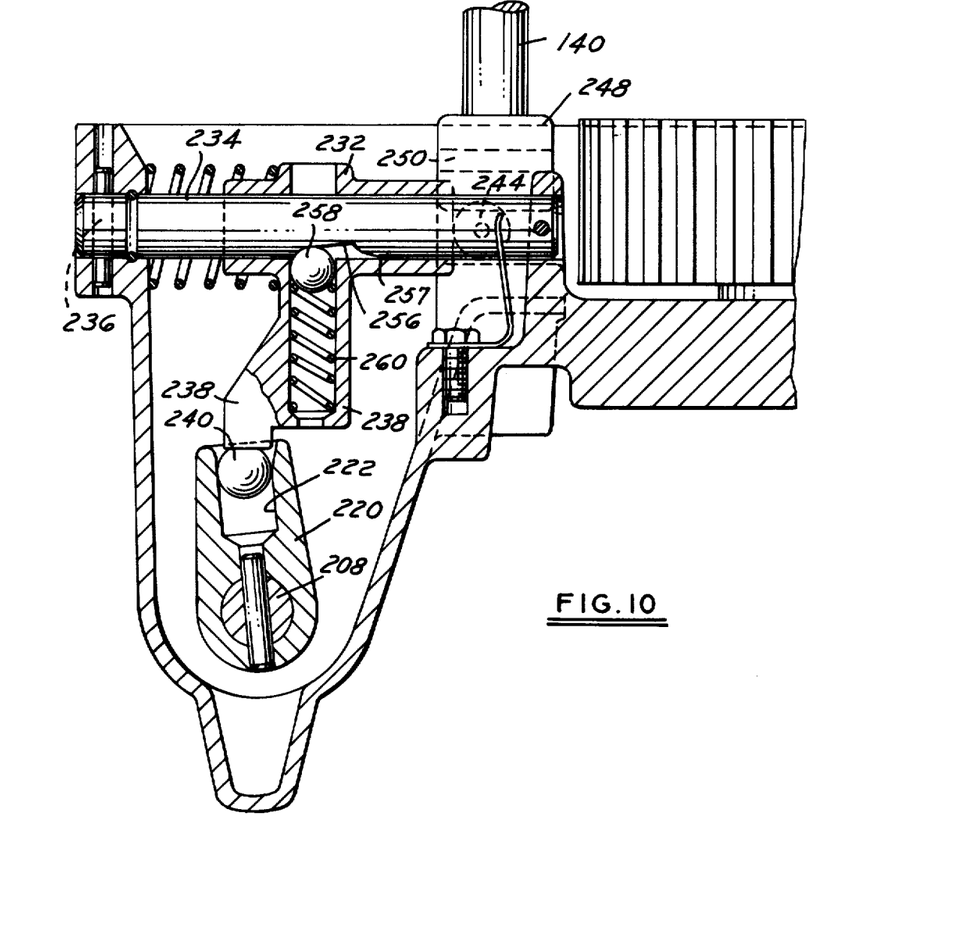
FIG. 10 is a cross-section taken at plane 10—10 of FIG. 9 showing the shift mechanism.

A relay lever 232 for transmitting the motion of the selector shaft 208 to the first shift rail 140 is journalled on a stub shaft 234. The shaft 234 is supported on the transmission housing and secured thereto by the pin 236. The relay lever 232 has a first arm 238 that extends radially outward from the axis of the stub shaft 234 and has a spherical end portion 240 that is received in the cylindrical socket 232 of the selector block 220. A second arm 242 extending radially outward from the axis of the stub shaft 234 has a spherical end 244 fitted within a spherical socket 246 formed in a collar 248, which is fixed to the shift shaft 140 by the pin 250. The axis of the socket 246 extends radially outward from the axis of the shift shaft 140. A second arm 252 formed integrally with a collar 248 extends outwardly from the axis of the shift shaft 140 and has a spherical end 254. The shift shaft 140 is journalled in the transmission housing at the cylindrical bores 142, 143 for rotation and axial sliding motion with respect to the transmission housing. Because the collar 248 is pinned to the shaft 140, rotation and axial displacement imparted to the collar 248 by the relay lever 232 produces a similar motion in the shift shaft 140. For example, when the relay lever 232 moves axially on the stub shaft 234, the collar 248 and the shaft 140 rotate. When the relay lever 232 rotates about the axis of the stub shaft 234, the collar 248 and the shaft 140 move axially on the support surfaces 142, 143. Similarly, when the selector shaft 208 moves axially on the support surfaces 210, 211, the relay lever 232 rotates about the axis of the stub shaft 234. When the selector shaft 208 rotates about its central axis, the relay lever 232 slides axially on the outer surface of the stub shaft 234.

As seen in FIG. 10, the stub shaft 234 has two annular recesses 256, 257 that are engageable by a ball 258 which is biased by a spring 260 mounted on the arm 238. When the relay lever 232 slides axially on the stub shaft 234 the detent ball moves first within the recess 256 and, when the mechanism is positioned for fifth speed ratio operation, the detent ball engages the recess 257. In passing from the recess 256 to the recess 257, the spring 260 is compressed, a greater force is applied to the relay lever 238, and the vehicle operator experiences the need for increased effort to be applied to the shift cane in order to position the mechanism for fifth speed ratio operation.

Figure 7:
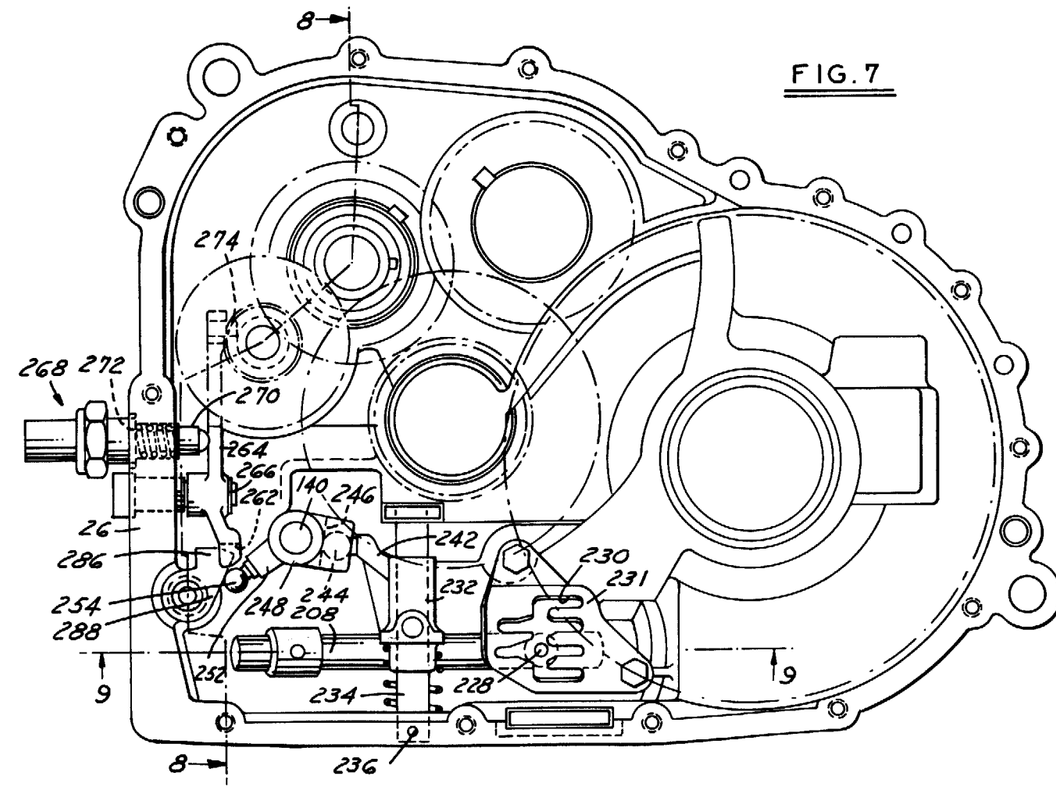
FIG. 7 is a cross-sectional end view of the transmission shift mechanism and gearing arrangement.

FIGS. 7 and 8 show that portion of the shifting mechanism that operates to place the gearing in position for reverse drive. As the collar 248 is rotated about the axis of the shift rail 140, the spherical end 254 on the shift shaft collar 248 can be brought into engagement with the notch 262 that is formed on the end of the reverse shift bellcrank 264. The bellcrank 264 is journalled on the surface of the stub shaft 266, which is fixedly mounted on the transmission housing 26. A reverse shift inhibitor and back-up light assembly 268 includes a detent portion 270 which is biased inwardly by the coil spring 272 to seat in a mating surface formed on the bell crank 264. The operating end of the bellcrank has a pin 274 mounted thereon and extending transversely therefrom and is fitted in an annular recess 278 formed on the reverse idler 70. The reverse idler 70 is slidably mounted on the support shaft 276 for axial movement in response to rotation of the bellcrank 264. The support shaft is fixed at one end to a support block 280 which is secured to the transmission housing by the attachment bolt 282. At the opposite end, the shaft 276 is received in an opening 284 in the transmission housing.

In operation, movement of the shift cane to a neutral position in the reverse gear plane of FIG. 11, causes selector shaft 208 to rotate about its axis, the relay lever 232 to move axially on the stub shaft 234 and the shift collar 248 to rotate the spherical end 254 into engagement with the notch 262. When the spherical end 254 engages the notch 262, the arm 286 of the pawl 288 is caused to rotate out of engagement with the notch 262. The pawl 288 is biased by a torsion spring 290 so that the arm 286 engages notch 262 in the position shown in FIG. 7 except when reverse gear is selected. When the spherical end 254 is rotated away from the notch 262, the arm 286 will again be received in the notch 262. When the vehicle operator moves the shift cane in the reverse plane to the reverse drive position, the shift selector shaft 208 moves axially, the relay lever 232 rotates about the axis of the stub shaft 234, the shift collar 248 and shift rail 140 move axially, and the bellcrank 264 pivots about the axis of the stub shaft 266. Rotation of the bellcrank 264 causes the reverse idler 70 to slide on its support shaft 276 and into meshing engagement with the reverse gears 32, 64.

Movement of the shift cane in the reverse drive plane to the neutral position causes the reverse idler 70 to become disengaged from the reverse gears 32, 64. Upon movement of the shift cane out of the reverse drive plane, the spherical end 254 disengages the notch 262, the pawl arm 286 is reengaged in the notch 262, and the reverse inhibitor detent pin 270 is reseated in its mating surface on the bellcrank 264. The detent 270 is depressed within the assembly 268 and completes an electrical circuit that can operate to light the backup lamp of the vehicle when the shift mechanism is positioned for reverse drive operation.

FIG. 11 shows the shift motion diagram through which the manually controlled shift cane is moved by the vehicle operator to select the various driving ratios of the transmission.

I claim:

1. A shift mechanism for controlling a multiple speed transmission comprising:
   a torque input shaft;
   a first countershaft;
   a second countershaft;
   gearing defining multiple torque delivery paths including multiple pairs of gears carried by said input shaft and said first and second countershafts;
   synchronizer clutch means carried by the first and second countershafts and associated with one gear of each pair for drivably connecting said one gear to its associated countershaft;
   a differential gear assembly;
   torque output gearing connecting said differential gear assembly with said first and second countershafts whereby torque is delivered from said gearing to said differential assembly;
   a first shift rail and a second shift rail;
   first and second shift forks mounted slidably on said first shift rail, and a third shift fork mounted slidably on said second shift rail for moving the synchronizer clutch means thereby driveably connecting one gear of each gear pair to its associated countershaft;
   a linkage mechanism for effecting shifting movement of said first, second and third shift forks including:
   a shift selector shaft adapted for rotary and axial movement mounted in transverse disposition with respect to said first shift rail;
   a relay lever mounted for rotation and sliding motion in transverse disposition with respect to said shift selector shaft having first and second operating arms engaged respectively with said shift selector shaft and said first shift rail whereby axial movement of said selector shaft produces axial movement of said first shift rail and rotary motion of said selector shaft produces rotary motion of said first shift rail;
   a first bellcrank pivotably mounted in transverse disposition with respect to said first shift rail having a first end engaged with said third shift fork;
   a reverse idler pinion slidably mounted on a support shaft for movement into and out of engagement with reverse drive gears on said input shaft and said first countershaft;
   a second pivotably mounted bellcrank having a first end disposed adjacent said first shift rail and a second end engaged with and adapted to slide said reverse idler pinion on its support shaft;
   a shift collar secured to said first shift rail adjacent said relay lever having an operating arm adapted to engage the first end of said second bellcrank, whereby said second bellcrank is engaged by the arm of said shift collar upon rotation of said first shift rail whereafter said second bellcrank is pivoted and the reverse idler pinion is shifted as a result of axial motion of said first shift rail and said selector shaft; and
   selector means mounted on said first shift rail adapted to rotate into registry selectively with the second end of said first bellcrank and the first and second shift forks whereby axial movement of said first shift rail produces axial shifting movement of said synchronizer clutch means.

2. The shift mechanism according to claim 1 further comprising:
   selector means fixed to said first shift rail;
   an interlock collar slidably mounted on said first shift rail adapted for rotary motion as said first shift rail rotates but prevented from axial motion including:
   a slot permitting said selector means to move therethrough as said first shift rail moves; and
   blocking means engageable with two elements of the group consisting of said first bellcrank, said first shift fork and said second shift fork, when said selector means engages the other element of the group.

3. A shift mechanism for effecting shifting movement of first and second shift forks mounted on a first shift rail, a third shift fork mount on a second shift rail and a reverse idler pinion mounted on a support shaft comprising:
   a shift selector shaft adapted for rotary and axial shifting movement mounted in transverse disposition with respect to the first shift rail;
   a relay lever mounted for rotation and sliding motion in transverse disposition with respect to said shift selector shaft having first and second operating arms engaged respectively with said shift selector shaft and said first shift rail whereby axial movement of said first shift rail and rotary motion of said selector shaft produces rotary motion of said first shift rail;
- a first bellcrank pivotably mounted in transverse disposition with respect to said first shift rail having a first end engaged with said third shift fork and a second end disposed adjacent said first shift rail;
- a second pivtably mounted bellcrank having a first end disposed adjacent said first shift rail and a second end engaged with and adapted to slide the reverse idler pinion on its support shaft;
- a shift collar secured to said first shift rail adjacent said relay lever having an operating arm adapted to engage the first end of said second bellcrank, whereby said second bellcrank is engaged by the arm of said shift collar upon rotation of said first shift rail whereafter said second bellcrank is pivoted and the reverse idler pinion is shifted as a result of axial motion of said first shift rail and said selector shaft; and
- selector means mounted on the first shift rail adapted to rotate into engagement selectively with the second end of said first bellcrank and the first and second shift forks whereby axial movement of the first shift rail produces axial shifting movement of the first, second and third shift forks, respectively, upon selective engagement of said selector means with the second bellcrank end or the first or second shift forks.

* * * * *